(12) United States Patent
Brown et al.

(10) Patent No.: US 10,856,472 B1
(45) Date of Patent: Dec. 8, 2020

(54) MOW STRIP, KIT, AND ASSEMBLY

(71) Applicants: Justin M. Brown, West Point, UT (US); Derek Bosch, West Jordan, UT (US)

(72) Inventors: Justin M. Brown, West Point, UT (US); Derek Bosch, West Jordan, UT (US)

(*) Notice: Subject to any disclaimer, the term of this patent is extended or adjusted under 35 U.S.C. 154(b) by 0 days.

(21) Appl. No.: 16/502,739

(22) Filed: Jul. 3, 2019

(51) Int. Cl.
  *E04H 17/00* (2006.01)
  *A01G 9/28* (2018.01)
  *E04H 17/14* (2006.01)

(52) U.S. Cl.
  CPC ............ *A01G 9/28* (2018.02); *E04H 17/14* (2013.01); *E04H 2017/1447* (2013.01)

(58) Field of Classification Search
  CPC .... E04H 2017/1447; E04H 17/14; A01G 9/28
  See application file for complete search history.

(56) References Cited

U.S. PATENT DOCUMENTS

| | | |
|---|---|---|
| 3,933,311 A | 1/1976 | Lemelson |
| 4,690,382 A | 9/1987 | Koperdak |
| 4,903,947 A | 2/1990 | Groves |
| 5,039,065 A | 8/1991 | Denton |
| 5,480,126 A | 1/1996 | Teasdale |
| 5,515,659 A | 5/1996 | MacDonald et al. |
| 5,615,866 A | 4/1997 | Kinnison |
| 5,924,680 A | 7/1999 | Sicking et al. |
| 6,070,859 A | 6/2000 | Damon et al. |
| 6,076,320 A | 6/2000 | Butler |
| 6,125,597 A | 10/2000 | Hoffman et al. |
| D446,315 S * | 8/2001 | Forbis .......... D25/38.1 |
| 6,299,141 B1 | 10/2001 | Lindsay et al. |
| D487,158 S * | 2/2004 | Forbis .......... D25/122 |
| 6,880,300 B2 | 4/2005 | Hawkes |
| 7,628,385 B2 | 12/2009 | Laird |
| 8,206,056 B2 | 6/2012 | O'Banion et al. |
| 2001/0013594 A1 | 8/2001 | Thompson et al. |
| 2003/0052314 A1 | 3/2003 | DiPlacido |
| 2004/0000665 A1 | 1/2004 | Himmelreich |
| 2006/0081827 A1 | 4/2006 | Strong et al. |

(Continued)

FOREIGN PATENT DOCUMENTS

| | | | | |
|---|---|---|---|---|
| WO | WO-2016027917 A1 * | 2/2016 | ............ | A01G 9/029 |
| WO | WO-2018201203 A1 * | 11/2018 | ............ | E04B 7/00 |

*Primary Examiner* — Babajide A Demuren
(74) *Attorney, Agent, or Firm* — Jason P. Webb; Pearson Butler

(57) ABSTRACT

A mow strip, mow strip kit/assembly. There are front and back brackets coupled to an elongated mow strip body. The brackets, coupled to the base of a pair of adjacent fence posts, include flat protrusions extending orthogonally from a mounting plate. The elongated mow strip body has a flat side parallel to flat side of the fence posts to make a flush connection. The top of the mow strip includes a groove into which a fence rail may be disposed. A mounting structure on each face of the mow strip includes slits shaped and positioned to receive the protrusion of the brackets. The slits extend along and through an end of the bottom surface of the mow strip such that at the end of the bottom surface the elongated mow strip body may be vertically lowered directly onto one of the protrusions.

14 Claims, 6 Drawing Sheets

(56) References Cited

U.S. PATENT DOCUMENTS

| | | | |
|---|---|---|---|
| 2007/0089358 A1* | 4/2007 | Verkamp | A01G 9/28 |
| | | | 47/33 |
| 2008/0001329 A1 | 1/2008 | Vannimwegen et al. | |
| 2011/0127480 A1 | 6/2011 | Sicking et al. | |
| 2011/0252702 A1* | 10/2011 | Gazjuk | A01G 9/28 |
| | | | 47/33 |
| 2017/0211272 A1* | 7/2017 | Cullinan | E04C 2/38 |
| 2017/0215345 A1* | 8/2017 | Penterman | A01G 9/28 |
| 2018/0030775 A1* | 2/2018 | Walsh | E06B 1/30 |
| 2018/0142496 A1* | 5/2018 | Lin | E04H 17/14 |
| 2018/0369894 A1* | 12/2018 | Avetsisiants | B21D 39/044 |
| 2019/0010726 A1 | 1/2019 | Mann | |

* cited by examiner

MOW STRIP, KIT, AND ASSEMBLY

BACKGROUND OF THE INVENTION

Cross-Reference to Related Applications

None.

FIELD OF THE INVENTION

The present invention relates to fencing, specifically to mow strips, kits and assemblies.

DESCRIPTION OF THE RELATED ART

In the related art, it has been known to use landscape edgings and fence guards to eliminate the need for horizontal trimming of grass at lawn borders, such as fences. Landscape edgings and fence guards heretofore proposed generally consist of a retaining strip, a mowing strip, or both. Retaining strips (RS) are elongated barriers installed longitudinally along the surface of the ground such that the barrier is substantially perpendicular to the ground. In landscape edgings, RS are used either to separate different types of landscaping materials (such as lawn, gravel walkways, beds of decorative rock, beds of bark, gardens etc.) or to retain elevated beds of earth or other landscaping till. In fence guards, RS are abutted along the base of a fence and are used to maintain a desired spatial relationship between a mowing strip and the fence and thus protect the bottom edge of the fence from damage by a lawnmower, a lawn edging device, or animals; to protect lawnmowers, lawn edging devices, and animals from damage by the bottom edge, of the fence; and to discourage animals from digging underneath fences.

Mowing strips (MS) are installed along a lawn border and have a top face that is flush with the surface of the ground. By running the wheels attached to one side of a lawnmower onto and along a MS, one can cut all grass immediately adjacent to the MS. Consequently, MS are used to reduce or eliminate the need for horizontal trimming of grass at lawn borders.

Most MS currently in use are constructed by end to end assemblage of rigid segments formed from concrete, wood, or brick. Such MS must be buried into the ground so that the top surface of the strip is essentially at ground level. Such subterranean installation is tedious, requiring the digging of trenches, and, in the case of concrete MS, construction of forms. Further, multiple steps/stages are generally required with time between to allow for cementing of materials.

Due to their thickness, none of these MS are as easily installed under existing fence as in open, unobstructed terrain. Concrete or mortared brick MS are very difficult to remove and cannot be conveniently reused in a different location. Unmortared bricks and unstaked wood occasionally get knocked out of position. Wood MS suffer the additional disadvantages of rotting and of not conforming easily to changes in ground slope.

MS can be classified as being of the continuous elongated type or of the segmented type. The segmented type comprises a plurality of relatively short sections (segments) installed in series. Because the sections composing segmented MS are relatively short (typically less than 4 feet) in length, a relatively large number of sections is needed to construct a given length of MS, and the resulting MS will have a relatively large number of joints between sections. One of the problems with segmented MS is that their construction can be tedious and time-consuming, requiring the assembly of a relatively large number of pieces. An even more serious problem with segmented MS is maintenance of the joints between sections. If no deliberate attempt is made to connect adjacent abutted sections of a segmented MS, grass can easily encroach across the MS barrier between the abutted sections, and also, the sections can easily be knocked out of alignment.

Examples of segmented MS that demonstrate these problems are those constructed of concrete blocks. Furthermore, virtually all deliberate attempts to overcome these problems by connecting or overlapping adjacent MS sections are defeated by the natural expansion and contraction of the ground that accompanies freeze/thaw cycles, changes in ground moisture content, fire ant activity, or the like. For example, such expansion and contraction of the ground often cracks the joints of mortared brick MS.

Landscape edgings of this type are relatively complicated assemblies of base plates and cap members. Adjoining cap members are preferably interlocked by underlapping base plates. If adjoining base plates are not precisely aligned, the tabs in the overlapping cap members will not "snap" into the corresponding slots in the base plates. Precise alignment and overlap of a relatively large number of segments is unnecessarily complicated, time-consuming, and tedious.

Natural forces, such as expansion and contraction of the ground with freeze/thaw cycles, changes in ground moisture content, fire ant activity, and the like, will cause the joints between adjacent cap members to become separated or jammed. Even a slight separation provides an opportunity for grass to grow between cap members and encroach into an area where grass is not wanted. The stress on jammed cap members can pop them off of the base plates. The use of shiplap joints between cap members does not adequately overcome these problems. The relatively large number of joints present in segmented landscape edgings of this type greatly increase the effort required to maintain separated or jammed joints.

Another disadvantage is that landscape edgings of this type do not conform easily to changes in ground slope. This deficiency, which has the undesirable consequences described above, arises from several factors. One factor is that the cap members of these landscape edgings are stated to be constructed of a relatively rigid material such as filled plastic or fibrous concrete. Such rigid materials inherently prevent the landscape edging from conforming easily to changes in ground slope. Another factor is that the ground might dip between the ends of a cap member, and no means are provided for pulling the center of a cap member into a dip.

Some improvements have been made in the field. Examples of references related to the present invention are described below in their own words, and the supporting teachings of each reference are incorporated by reference herein:

U.S. Pat. No. 5,480,126, issued to Teasdale, discloses the fencing construction comprises sleeve for covering an elongated beam. The sleeve has a pair of symmetric L-shaped parts provided with opposite male and female interlocking members longitudinally extending along free edges thereof for meshing in a locking engagements and holding the two parts together around the beam. It allows to either upgrade and existing fence or constructs a new fence with low cost materials, such as wood, and transforms at least parts thereof into a PVC-like fence for improving its service life.

U.S. Pat. No. 5,615,866, issued to Kinnison, discloses a vegetation barrier device for use in association with the lowermost extremity of a fence is constructed of a first member having an L-shaped extruded configuration and a second member in the form of an elongated flat strip. The two members are assembled upon the fence by bolts which penetrate the fence and both members to form a U-shaped structure defining an interior region capable of releasably holding a water-leachable insecticidal agent.

U.S. Pat. No. 6,070,859, issued to Damon et al., discloses an improved blocking member and vegetation barrier for the bottom of fences includes a rise portion that runs along one side of the fence. The rise is somewhat flexible and is securable to the fence in a manner that allows the installer to adjust the rise vertically relative to the fence or other portions of the riser, if necessary, and restrain it from any substantial vertical movement once secured. A ground covering member extends transversely from the lower part of the riser. Thus, the ground covering member can be placed directly on the ground even if the ground undulates relative to the fence bottom, and can be kept in that position once the riser is secured to the fence. The ground covering member can be resilient and create reactionary force if it is pressed against the ground. This can further assist in maintaining the blocking member and vegetation barrier in a fixed position relative to the ground and the fence. The device can be made in lengths that can be interconnected by spacers that extend between the lengths.

U.S. Patent Application Publication No.: 2006/0081827 A1, by Strong et al., discloses a fence may include one or more fence panels and the fence panels are preferably constructed from blow-molded plastic. The fence panels may include a support structure that is sized and configured to support the fence panels. The fence may also include a mower strip to obstruct plant growth proximate the fence. The mower strip is preferably constructed of plastic and it may be integrally formed with the fence panels. The fence may include one or more filler fence panels. Advantageously, the filler fence panels may be sized and configured to support and/or position the fence panels above and uneven surface.

U.S. Patent Application Publication No.: 2019/0010726 A1, by Mann, discloses a substantially rectangular plinth member for installation at the base of a fence to at least partially close a space between the fence and a ground surface underneath the fence. The plinth member is elongate and comprises a first major surface and an opposite second major surface. The plinth member has a major axis and a minor axis extending perpendicular thereto, the major and minor axes defining a notional center plane of the plinth member. The plinth member has fist and second end margins at its respective opposite ends along the major axis and third and fourth end margins at its respective opposite ends along the minor axis. A plurality of substantially parallel stiffening formations are defined by portions of the plinth member that are displaced from the notional center plane, extend between the first and second end margins, and are spaced apart between the third and fourth end margins. The stiffening formations are configured such that the plinth member has a greater pressure load bearing capacity when loaded on the first major surface than it has when loaded on the second major surface.

The inventions heretofore known suffer from a number of disadvantages which include being expensive, being difficult to install, being slow to install, requiring wait times during installation, having limited color options, not properly matching the style/color of the fence, being too heavy, cracking, not having a warrantee that substantially matches that of an associated fence, not being safe, not being versatile, not being stable, being too weak, failing to create a flush straight bottom fence edge, and/or requiring filler panels.

What is needed is a mow strip, mow strip kit, and/or mow strip assembly that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available mow strips. Accordingly, the present invention has been developed to provide a mow strip, mow strip kit, and/or mow strip assembly.

In one non-limiting embodiment, there is a mow strip kit, that may include one or more of front and/or back brackets, and an elongated mow strip body. The brackets may include a mounting plate and/or one or more protrusions that may extend orthogonally from the mounting plate. The elongated mow strip body may include one or more of a top, bottom, left, and right, wherein: a bottom surface may extend the length of the elongated mow strip body; a flat left surface may be orthogonal to the bottom surface a flat right surface may be parallel to the flat left surface, may be spaced apart from the flat left surface, and/or may be orthogonal to the bottom surface; a top surface may be opposite the bottom surface and/or may be coupled to one or more of the flat left surface and flat right surface; a front mounting structure may be positioned orthogonal to one or more of the bottom surface, the flat left surface, and/or the flat right surface, and may include a slit shaped and/or positioned to receive the protrusion of the front bracket; and/or a back mounting structure, that may be opposite the front mounting structure, and may include a slit shaped and/or positioned to receive the protrusion of the back bracket, wherein it may be that at least one of the slits of the front mounting structure and the back mounting structure extend along and/or through an end of the bottom surface such that at the end of the bottom surface the elongated mow strip body may be vertically lowered directly onto one of the protrusions.

It may be that the top surface includes a groove extending the length thereof into which a fence rail may be disposed and cradled thereby. It may be that the top surface includes a pitched edge that is not orthogonal to the flat right surface and/or not orthogonal to the flat left surface. It may be that the slit of each of the front and back mounting structures are each disposed under the groove. It may be that the protrusions of the front bracket and/or back bracket are planar members. It may be that the front mounting structure and/or the back mounting structure include a recess into which the front and/or back brackets, respectively, nestle. It may be that the mounting plate of one or more of the brackets includes a coupling structure that is selectably coupleable to a fence post. It may be that the mounting plate of one or more of the brackets includes a spike extending downwardly configured to couple the bracket to a ground.

In another non-limiting embodiment, there is a mow strip assembly. The mow strip assembly may include front and/or back fence posts coupled to each other via a mow strip disposed therebetween. Each fence post may include a right surface, a base, and/or a pair of protrusions extending orthogonally from near the base. The mow strip may include an elongated mow strip body that may be coupled to each of the front fence post and the back fence post at the base of each. It may be that the elongated mow strip body has: a bottom surface extending the length of the elongated mow strip body; a flat right surface that may be orthogonal to the bottom surface and/or coplanar with the right surface of one or more of the front and back fence posts; a flat left surface that may be parallel to the flat right surface, may be spaced apart from the flat right surface, and/or may be orthogonal to the bottom surface; a top surface that may be opposite the bottom surface and/or coupled to one or more of the flat left surface and flat right surface; a front mounting structure that may be positioned orthogonal to one or more of the bottom surface, the flat left surface, and/or the flat right surface, which may also include one or more slits enveloping the pair of protrusions of the front fence post; and/or a back mounting structure, that may be opposite the front mounting structure, and may include one or more slits that may be shaped and/or positioned to receive one or more protrusions of the back fence post.

It may be that the pair of protrusions extend from brackets coupled to each of the front and back fence posts. It may be that the brackets each include a mounting plate and the pair of protrusions are planar members parallel to each other. It may be that the top surface includes a groove extending the length thereof into which a fence rail extending between the front and back fence posts is disposed and cradled thereby. It may be that the top surface includes a pitched edge that is not orthogonal to the flat right surface and not orthogonal to the flat left surface. It may be that the pair of protrusions of each of the front fence post and back fence post are planar members that are parallel to each other. It may be that the left right surface of the elongated mow strip body is coplanar with a left surface of each of the front and back fence posts.

In still another embodiment, there is a mow strip that may be of a polymeric material for use with fencing. The mow strip may include one or more of: a bottom surface; a flat left surface orthogonal to the bottom surface; a flat right surface parallel to the flat left surface, spaced apart from the flat left surface, and orthogonal to the bottom surface; a top surface opposite the bottom surface and coupled to each of the flat left surface and flat right surface, wherein the top surface, the bottom surface, the flat left surface, and the flat right surface together form a hollow elongated body; a front mounting structure positioned orthogonal to each of the bottom surface, the flat left surface, and the flat right surface, including a pair of slits extending upwardly into the mow strip from the bottom surface at a front end of the hollow elongated body; and/or a back mounting structure, opposite the front mounting structure, including a pair of slits extending upwardly into the mow strip from the bottom surface at a back end of the hollow elongated body.

It may be that the top surface includes a groove extending the length thereof. It may be that the top surface includes a first pitched edge that is not orthogonal to the flat right surface and not orthogonal to the flat left surface. It may be that the top surface includes a second pitched edge that is not orthogonal to the flat right surface and not orthogonal to the flat left surface and that is spaced from the first pitched edge by the groove. It may be that the polymeric material is vinyl.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
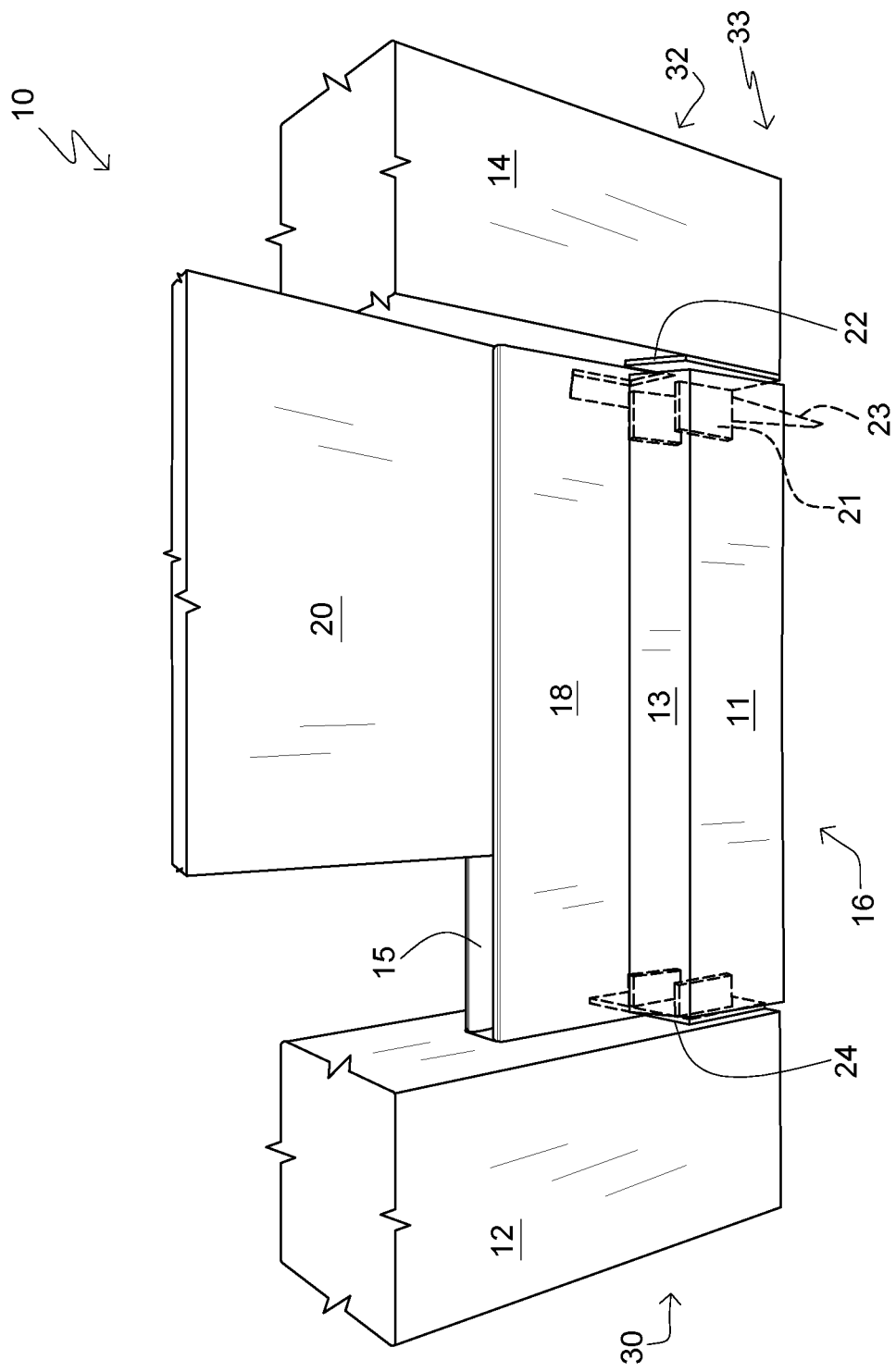
FIG. 1 is a right-side partial perspective view of a mow strip assembly, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of." In addition, terms like "front," "back," "left," and "right," are used merely to show location.

FIG. 1 is a right-side partial perspective view of a mow strip assembly 10, according to one embodiment of the invention. As shown, the mow strip assembly 10 includes a front bracket 22 and a back bracket 24. The brackets 22, 24 each include a mounting plate with protrusions 21 extending from the mounting plates. The protrusions 21 may have a ground spike 23. The mow strip assembly 10 also includes a mow strip body 16. The mow strip body 16 has a right surface 11 and a pitched edge 13. In addition, the mow strip assembly 10 has a back fence post 30 and a front fence post 32 coupled to opposite ends of the mow strip body 16. The back fence post 30 and the front fence post 32 each have right surfaces 12 and 14, respectively. Accordingly, the fence posts 30 and 32 help to create a base 33. Further shown, there is a fence rail 18 disposed between fence posts, 30 and 32, and along the mow strip body 16. The fence rail has a rail groove 15 and a panel 20 disposed within the rail groove 15.

The illustrated front bracket 22 and back bracket 24 are coupled to opposite ends of the mow strip body 16. The front bracket 22 is coupled to the front fence post 32, and the back bracket is coupled to the back fence post 30. The brackets, 22 and 24, may couple to the adjacent posts, 32 and 30, or may be integral to the posts, 32 and 30. The front and back brackets 22 and 24 include protrusions 21. The protrusions 21 may include a ground spike 23 for anchoring the mow strip assembly 10 into the ground. The protrusions 21 may be planar members. The protrusions 21 may be parallel to each other. Accordingly, the brackets, 22 and 24, help to stabilize and/or secure the mow strip assembly 10. The brackets, 22 and 24, may also help to form a base 33 of the mow strip assembly 10. As a result, the brackets, 22 and 24, may help the mow strip body 16 to removably couple to the fence posts 30 and 32. The brackets 22 and 24 may have any size and/or shape for coupling, holding, securing, stabilizing, etc. More, the brackets, 22 and 24, may be comprised of materials such as, but not limited to: plastic, metal, vinyl, wood, concrete, and so on. The brackets, 22 and 24, may be comprised of a polymer. Additionally, the brackets, 22 and 24, don't have to be full profile of the mow strip 16; can have any number of protrusions 21; the protrusions 21 don't have to be planar; they may be attached by screw, rivet, welding, adhesive, nails, bolts, clips, integral, friction fitting; and may be coupled to ground at the post, 30 or 32, by a spike instead of being coupled to the post 30 or 32.

Also illustrated, there is a mow strip body 16 disposed between a front fence post 32 and a back fence post 30. The illustrated mow strip body 16 is coupled to the fence posts, 32 and 30, by brackets 22 and 24. However, the mow strip body 16 may be coupled to the fence posts, 32 and 30, by a variety of coupling fashions, such as, but not limited to: tension-fit, tongue and groove, screwing, bolting, and nailing. The mow strip body 16 may have any size, length, volume, and/or shape for coupling between the fence posts, 32 and 30. The mow strip body may be substantially hollow. The mow strip body may include slits, or coupling mechanisms, for receiving protrusions 21 of the brackets, 22 and 24. The mow strip body may slide down into the brackets, 22 and 24. Further, the mow strip body 16 may have: various profile shapes; various materials; various manufacturing techniques like blow molding, extruding, etc.; snap-in fitting to bracket; internal bracing that can vary according to needs; various side-profile shapes (e.g. triangular for sloped areas); and may have no groove 15 to couple to the rail 18. Moreover, the mow strip body 16 may be comprised of materials such as, but not limited to: plastic, metal, vinyl, wood, concrete, and so on. The mow strip body 16 may be comprised of a polymer.

Similarly, the illustrated fence posts, 32 and 30, may be comprised of materials such as, but not limited to: plastic, metal, vinyl, wood, concrete, and so on. The fence posts, 32 and 30, may be comprised of a polymer. The fence posts, 32 and 30, may have any size, length, volume, and/or shape for coupling to the mow strip body 16.

The illustrated mow strip body 16 has a right surface 11 disposed along a right side from the point of view of installing the mow strip assembly 10 between a pair of fence posts such as 32 and 30, with one facing one fence post, such as the back fence post 30, and with one's back to another fence post, such as the front fence post 32. Accordingly, just as terms like "front," "back," "left," and "right," are used to distinguish, the term "right" is used to distinguish parts from each other. The right surface may be substantially flat. The illustrated mow strip body 16 also has a pitched edge 13 disposed along a top. The pitched edge 13 may be pitched so that it couples to the right surface 11 at an angle, pitch, degree, slope, slant etc. The pitched edge 13 may have a substantially steep pitch, a substantially flat pitch, or no pitch.

Further illustrated, the back fence post 30 and the front fence post 32 each have right surfaces 12 and 14, respectively. The right surfaces 12 and 14 are from the point of view of installing the mow strip assembly 10 between a pair of fence posts such as 32 and 30, with one facing one fence post, such as the back fence post 30, and with one's back to another fence post, such as the front fence post 32. Hence, the terms "right," "front," "back," and etc. are used to distinguish parts from each other and are not intended to represent any particular perspective in the art. Accordingly, the fence posts 30 and 32 help to create a base 33. The base 33 may provide anchoring, stabilizing, securing, etc. for the mow strip assembly 10.

Also illustrated, there is a fence rail 18 disposed between fence posts, 30 and 32, and along the mow strip body 16. The illustrated fence rail has a rail groove 15 and a panel 20 disposed within the rail groove 15. The fence rail 18 and rail groove 15 may function as a track for sliding or inserting a panel. The fence rail 18 and rail groove 15 may have any size, length, volume, and/or shape for coupling to a panel 20. Additionally, the fence rail 18 may be comprised of materials such as, but not limited to: plastic, metal, vinyl, wood, concrete, and so on. The fence rail 18 may be comprised of a polymer. Accordingly, the bottom rail 18 of a fence may slide into the top groove 15 of the mow strip body 16.

The illustrated panel 20 is disposed within the rail groove 15. The panel 20 may be for providing a boundary. The panel 20 may provide privacy. Accordingly, the panel 20 may be a fence panel. The panel 20 may have any size, length, volume, and/or shape for coupling to the fence rail 18 and/or providing a boundary. In addition, the panel 20 may be comprised of materials such as, but not limited to: plastic, metal, vinyl, wood, concrete, and so on. The panel 20 may be comprised of a polymer.

In one non-limiting embodiment, there is a mow strip assembly 10 made out of vinyl. In an alternate non-limiting embodiment, there is a mow strip assembly 10 made out of vinyl. The vinyl assembly 10 may be just as durable as concrete but may have less installation and wait time as concrete. The vinyl assembly 10 may be quicker and cheaper. The mow strip assembly 10 has a mow strip body 16 with an extruded length of material that has a rectangular cross-section with pitched forms 13 at the top disposed about a cradle 18 that cradles the bottom rail 20 of the fence.

Additionally, in a non-limiting embodiment, there is a bracket-mounted mow strip body 16. There are two mounts disposed on each side of the mow strip body 16 to couple the mow strip body 16 to adjacent posts, 30 and 32. The mow strip body 16 may be comprised of extruded plastic and may have a hollow and/or rectangular form with a pitched surface top surface 13. The pitched surface 13 has a groove 15 extending a length of the top to mate with a bottom of a bottom rail of a fence. The mow strip body 16 has structural supports along a length thereof, and also has mounting struts to couple to the mounting brackets, 22 and 24. The brackets, 22 and 24, may have the same profile as the mow strip body 16, so that there is no gap between the posts, 30 and 32, and the mounted mow strip body 16. Each bracket, 22 and 24, may include one or more protrusions 21 to hold the mow strip body 16 in place, thereby preventing lateral, and possibly vertical-down, motion of the mow strip body 16. When the bottom rail of a fence is installed into the groove 15, vertical, or upward, motion of the mow strip body 16 may be prevented.

In another non-limiting embodiment, there is a mow strip assembly 10 with a mow strip body 16. The mow strip body 16 is plastic. There are two brackets, 22 and 24, that flank the mow strip body 16. The brackets, 22 and 24, couple the mow strip body 16 to adjacent posts, 30 and 32, of a vinyl fence.

Figure 2:
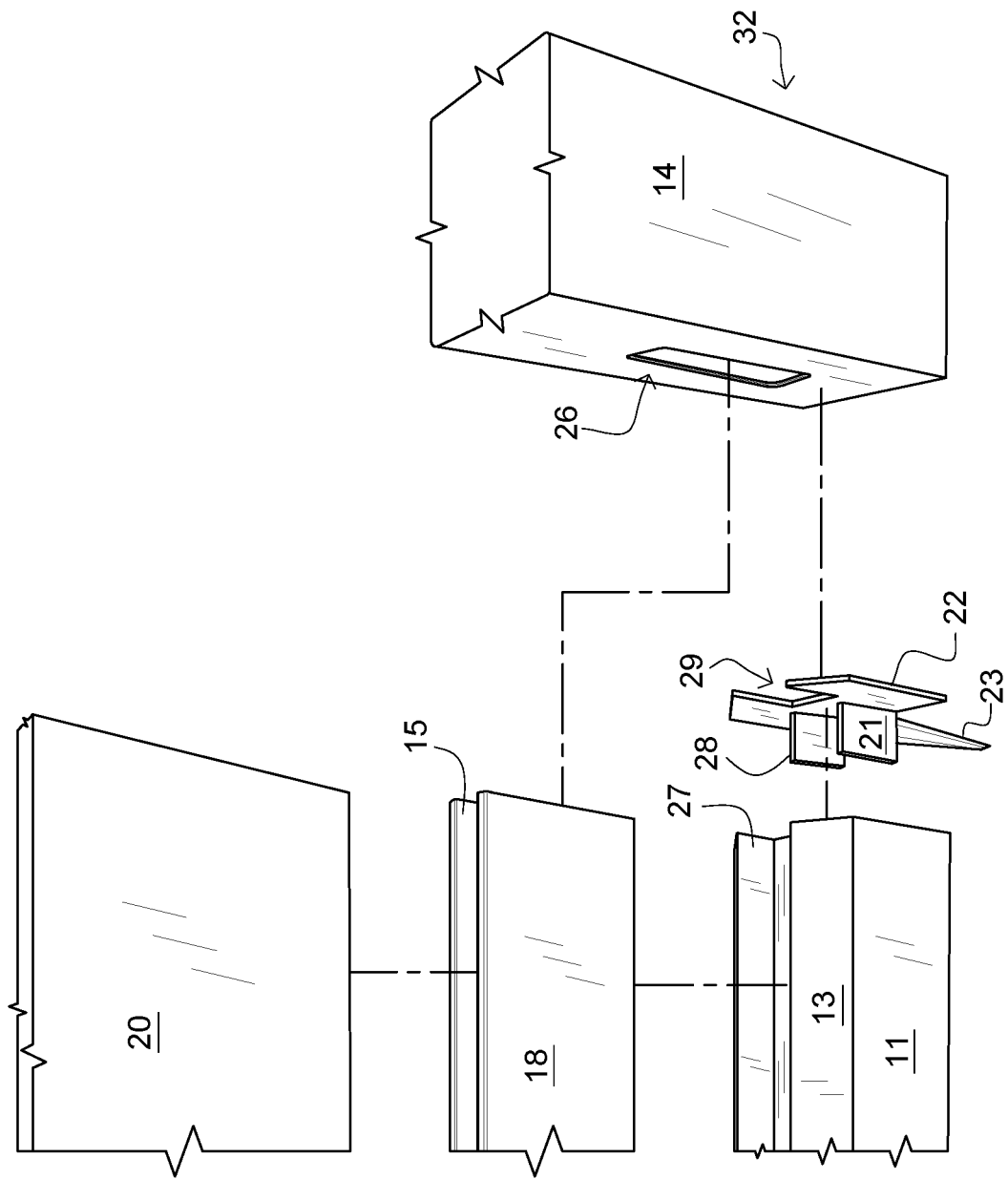
FIG. 2 is a partial exploded view of a mow strip assembly, according to one embodiment of the invention.

FIG. 2 is a partial exploded view of a mow strip assembly (e.g. See FIG. 1, element 10), according to one embodiment of the invention. As shown, the mow strip assembly (e.g. See FIG. 1, element 10) includes a front bracket 22 with a protrusion 21 and a ground spike 23 extending therefrom. There is also shown a post aperture 26, a groove of mow strip 27, a second protrusion 28, and a cutout for rail 29.

The illustrated protrusion 21 is coupled to the front bracket 22 and extends therefrom. The protrusion 21 may extend so that it couples to the right surface 11 and/or the pitched edge 13. Accordingly, the protrusion 21 may be a planar member. The illustrated ground spike 23 is coupled to the protrusion 21 and extends from the protrusion 21. The illustrated ground spike 23 may extend substantially downward. As a result, the ground spike 23 may be inserted into the ground for securing, anchoring, etc. the front bracket 22 to the ground. Hence, the back bracket may also include a ground spike 23. The bracket 22, protrusion 21, and ground spike 23 may be comprised of materials such as, but not limited to: plastic, metal, vinyl, wood, concrete, polymers, and so on. In addition, the bracket 22, protrusion 21, and ground spike 23 may be any size, shape, volume, etc. for securing or anchoring.

Also illustrated, there is a post aperture 26. The post aperture 26 is disposed along a side of the front fence post 32 adjacent to the right surface 14. The front bracket 22 may be disposed within the post aperture 26 for securing the front bracket 22 to the front fence post 32. Accordingly, the post aperture 26 may be shaped, sized and/or configured to receive the front bracket 22.

There is also illustrated a groove of mow strip 27. The groove of mow strip 27 is disposed substantially along a top portion of the pitched edge 13. The groove of mow strip 27 may allow the fence rail 18 to rest along the pitched edge 13. Accordingly, the groove or mow strip 27 may support the fence rail 18. The groove of mow strip may be shaped, sized and/or configured to receive the fence rail 18. The fence rail 18 further includes a rail groove 15 configured to receive a fence panel 20.

Further illustrated is a second protrusion 28. The second protrusion 28 is coupled to the front bracket 22 and extends therefrom. The second protrusion may extend substantially parallel to the protrusion 21. The second protrusion 28 may extend so that it couples to the right surface 11 and/or the pitched edge 13. Accordingly, the second protrusion 28 may be a planar member. The second protrusion 28 may be comprised of materials such as, but not limited to: plastic, metal, vinyl, wood, concrete, polymers, and so on. In addition, the second protrusion 28 may be any size, shape, volume, etc. for securing or anchoring.

In addition, there is illustrated a cutout for rail 29. The cutout for rail 29 is disposed along a top portion of the front bracket. The cutout for rail 29 is shaped to allow the fence rail 18 to rest snugly against the front fence post 32. The cutout for rail 29 may also provide additional support to the fence rail 18. As a result, the cutout for rail 29 may have shape, size and/or configuration to receive the fence rail 18 and allow the fence rail to abut the front fence post 32.

Figure 3:
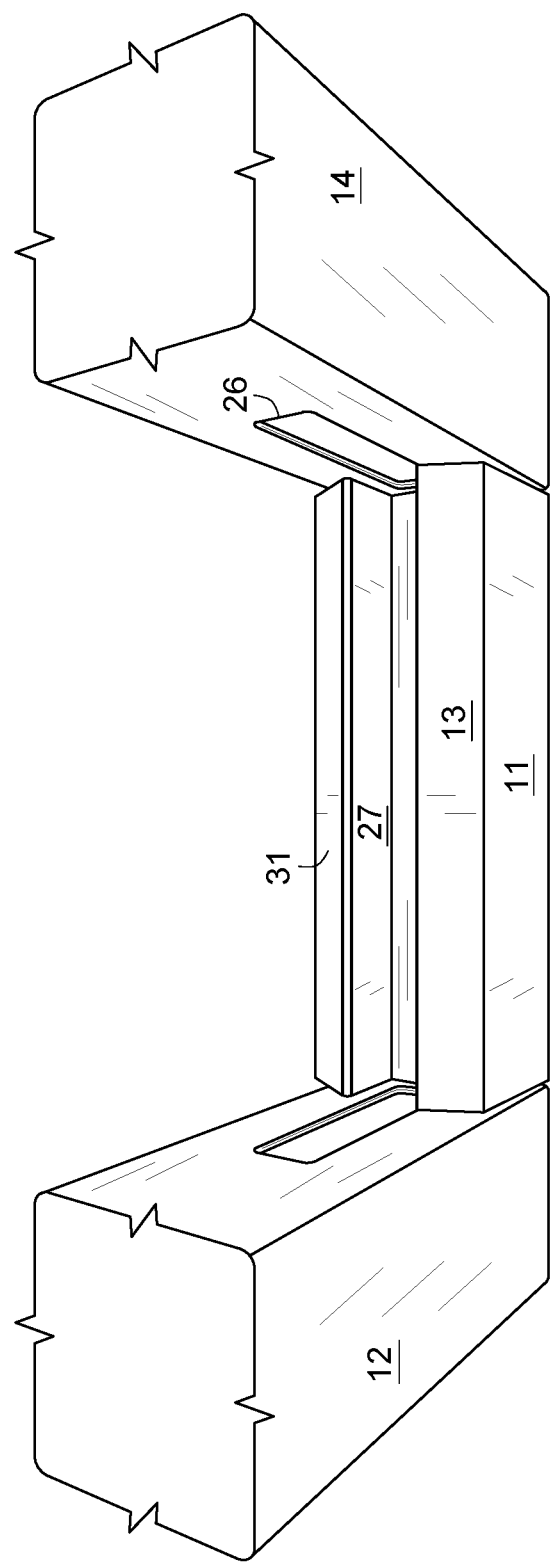
FIG. 3 is a right-side partial perspective view of a mow strip in situ, according to one embodiment of the invention.

FIG. 3 is a right-side partial perspective view of a mow strip (e.g. See FIG. 1, element 16) in situ, according to one embodiment of the invention. It may be that a left-side partial perspective view of a mowing strip is substantially identical thereto, being a mirror-image thereof. As shown, the mow strip (e.g. See FIG. 1, element 16) has a pitched edge 13. Also shown, coupled to the mow strip (e.g. See FIG. 1, element 16), there is a second pitched edge 31.

The illustrated pitched edge 13 is coupled to the right surface 11 and extends upward therefrom. Accordingly, the pitched edge 13 is not orthogonal to the flat right surface 11, as well as not orthogonal to the right surfaces 12 and 14. The pitched edge 13 may be pitched so that it couples to the right surface 11 at an angle, pitch, degree, slope, slant etc. The pitched edge 13 may have a substantially steep pitch, a substantially flat pitch, or no pitch. The pitched edge 13 may be comprised of materials such as, but not limited to: plastic, metal, vinyl, wood, concrete, polymers, and so on. In addition, the pitched edge 13 may be any size, shape, volume, etc. for securing, anchoring, or providing support to the fence rail (e.g. See FIG. 1, element 18).

Also illustrated, the second pitched edge 31 is spaced from the pitched edge 13 by the groove of mow strip 27 disposed between the pitched edge 13 and the second pitched edge 31. The groove or mow strip 27 may connect the pitched edge 13 to the second pitched edge 31. As a result, the groove or mow strip 27 may be comprised of materials similar to the edges, 13 and 31, such as, but not limited to: plastic, metal, vinyl, wood, concrete, polymers, and so on. The groove of mow strip 27 may be sized to receive a fence rail 18. Additionally, the post aperture 26 may be sized to receive a fence rail (e.g. See FIG. 1, element 18).

Like the pitched edge 13, the second pitched edge 31 is also not orthogonal to the flat right surface 11. Further, like the pitched edge 13, the second pitched edge 31 may be pitched so that it couples at an angle, pitch, degree, slope, slant etc. The second pitched edge 31 may have a substantially steep pitch, a substantially flat pitch, or no pitch. The second pitched edge 31 may be comprised of materials such as, but not limited to: plastic, metal, vinyl, wood, concrete, polymers, and so on. In addition, the second pitched edge 31 may be any size, shape, volume, etc. for securing, anchoring, or providing support to the fence rail (e.g. See FIG. 1, element 18).

Figure 4:
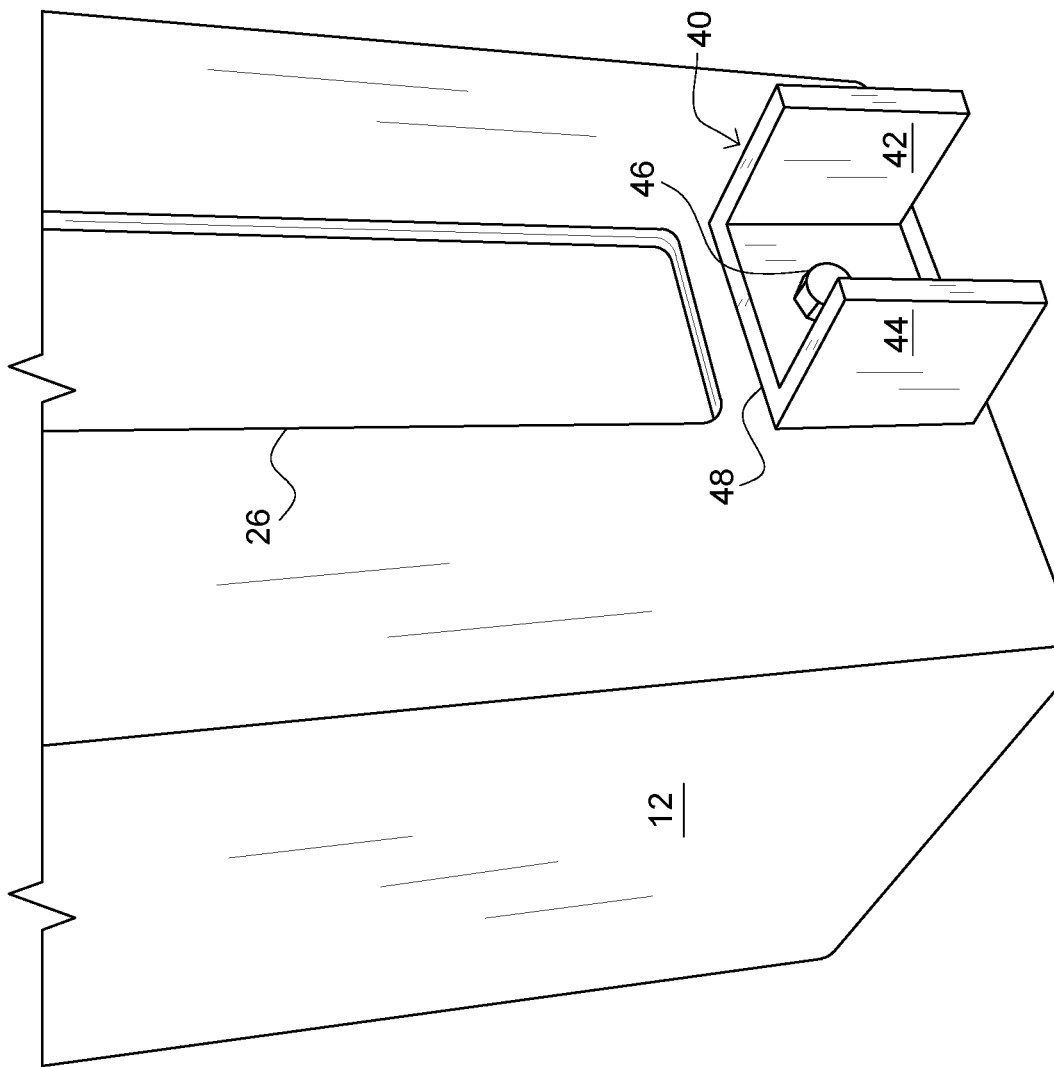
FIG. 4 is a perspective view of a bracket coupled near a base of a fence post, according to one embodiment of the invention.

FIG. 4 is a perspective view of a bracket (e.g. See FIG. 1, element 22 or 24), coupled near a base (e.g. See FIG. 1, element 33) of a fence post (e.g. See FIG. 1, element 30 or 32), according to one embodiment of the invention. As shown, the bracket 40 includes a first protrusion 42 and a second protrusion 44. The bracket 40 also has a connector 46 and a bracket base 48.

The illustrated first and second protrusions, 42 and 44, respectively, are coupled to the bracket 40 and extend outwardly therefrom. The first protrusion is coupled to the bracket 40 proximate the right surface 12. The second protrusion 44 is coupled to the bracket 40 distal the right surface. The protrusions, 42 and 44, may couple the mow strip body (e.g. See FIG. 1, element 16) to a fence post (e.g. See FIG. 1, element 30 or 32), by extending into slits of the posts (e.g. See FIG. 1, elements 30 and 32). Accordingly, the protrusions, 42 and 44, may have an identical shape and/or size. The protrusions, 42 and 44, may have different shapes and/or sizes. The protrusions, 42 and 44, may have any shape and/or size for coupling the mow strip body (e.g. See FIG. 1, element 16) to a fence post (e.g. See FIG. 1, element 30 or 32). The protrusions, 42 and 44, may be inherent in the bracket 40. The protrusions, 42 and 44, may be comprised of materials for bracketing such as, but not limited to: plastic, metal, vinyl, wood, concrete, polymers, and so on.

Also illustrated, the bracket 40 has a bracket base 48 disposed between the first protrusion 42 and the second protrusion 44, and below the post aperture 26. The bracket base 48 may provide support for the first protrusion 42 and the second protrusion 44. The bracket base 48 may couple the first protrusion 42 to the second protrusion 44. The bracket base 48 may be inherent in the bracket 40. The bracket base 48 may have any size, shape, and/or length for providing support to the bracket 40. The bracket base 48 may be comprised of materials such as, but not limited to: plastic, metal, vinyl, wood, concrete, polymers, and so on.

The illustrated bracket base 48 has a connector 46 disposed substantially through the bracket base 48. The connector 46 may connect the bracket 40 to a fence post (e.g. See FIG. 1, element 30 or 32). The connector 46 may be any connector such as, but not limited to: a bolt, a screw, a nail, etc. Accordingly, the connector 46 may have any size, shape, length, diameter, etc. for connecting. In addition, the connector 46 may be comprised of materials such as, but not limited to: plastic, metal, vinyl, wood, concrete, polymers, and so on. There may be more than one connector 46 to secure the bracket 40.

Figure 5:
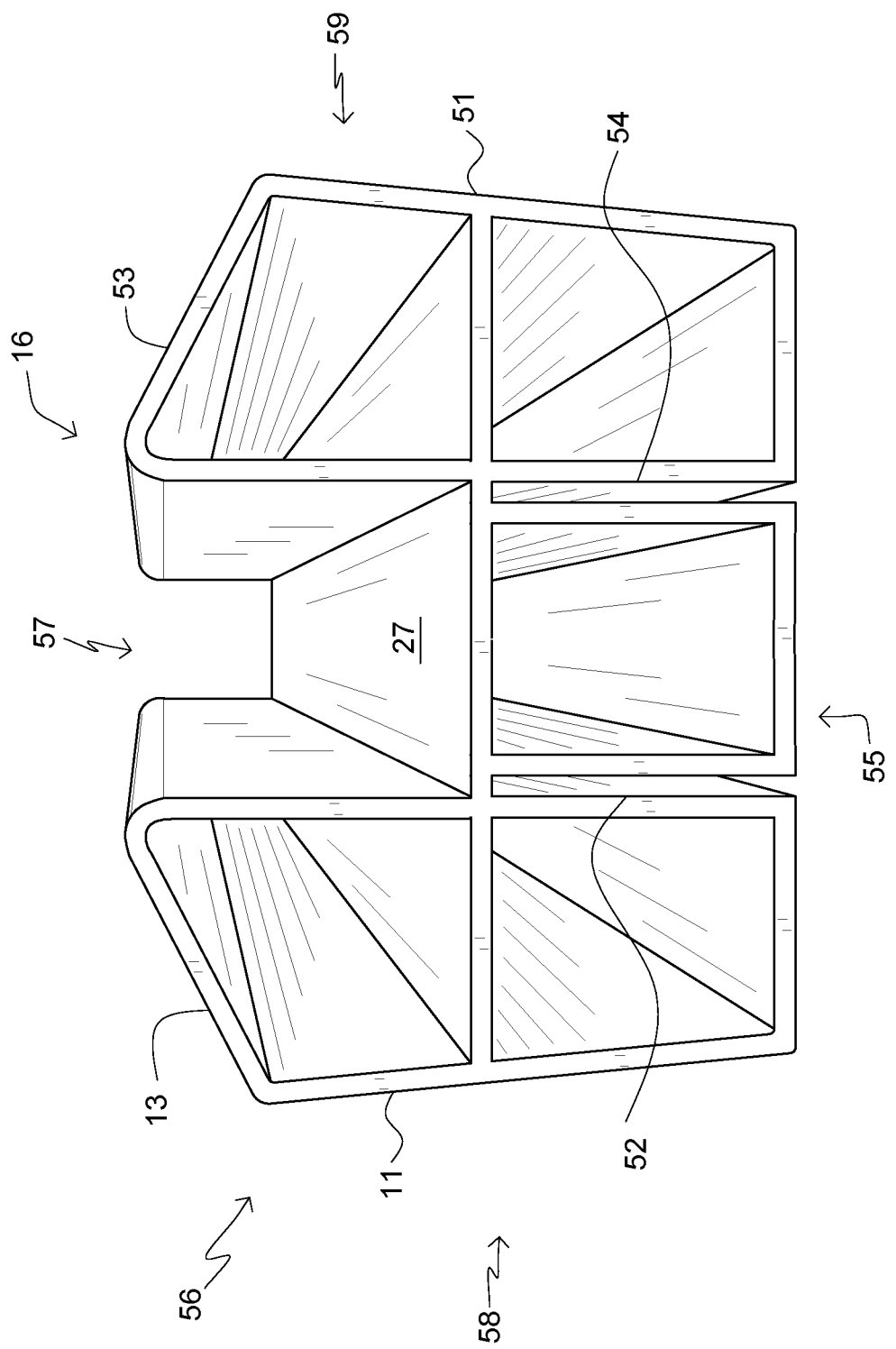
FIG. 5 is a front perspective view of a mow strip showing a front mounting structure, according to one embodiment of the invention.

FIG. 5 is a front perspective view of a mow strip 16 showing a front mounting structure 56, according to one embodiment of the invention. As shown, the front mounting structure 56 includes a first slit 52 and a second slit 54. The front mounting structure 56 also includes a left surface 51 with a second pitched edge 53.

The illustrated first and second slits, 52 and 54, respectively, are disposed along a bottom 55 of the front mounting structure 56 and extend upwardly therefrom. The slits, 52 and 54, may be openings, holes, notches, apertures, etc. The slits, 52 and 54, may house the first protrusion (e.g. See FIG. 4, element 42) and the second protrusion (e.g. See FIG. 4, element 44) of the bracket (e.g. See FIG. 4, element 40). As a result, the slits 52 and 54, may enable the front mounting structure 56 to couple to a bracket (e.g. See FIG. 4, element 40), and thereby also couple to a fence post (e.g. See FIG. 1, element 30 or 32). The slits, 52 and 54, may have any size, shape, dimension, volume, etc. for coupling to a bracket (e.g. See FIG. 4, element 40). As a result, in one non-limiting embodiment, the front mounting structure 56 may be positioned orthogonal to each of the bottom surface 55, the flat left surface 59, and the flat right surface 58. More, the front mounting structure 56 may include a pair of slits, 52 and 54, extending upwardly into the mow strip 16 from the bottom surface 55 at a front end of the hollow elongated body 16.

Also illustrated, the front mounting structure 56 has a left surface 51 with a second pitched edge 53. The left surface 51 is opposite and substantially parallel to the right surface 11. The left surface 56 is substantially orthogonal to the bottom surface 55 of the mow strip body 16. The left surface 56 is substantially flat.

The illustrated second pitched edge 53 is coupled to the left surface 56 and extends upwardly therefrom. The second pitched edge 53 is opposite the pitched edge 13. The groove of mow strip 27 is disposed between the second pitched edge 53 and pitched edge 13 at a top 57 of the mow strip. As a result, the second pitched edge 53 is not orthogonal to the left surface 56. Further, the second pitched edge 53 may be pitched so that it couples at an angle, pitch, degree, slope, slant etc. The second pitched edge 53 may have a substantially steep pitch, a substantially flat pitch, or no pitch. The left surface 51 and/or the second pitched edge 53 may be comprised of materials such as, but not limited to: plastic, metal, vinyl, wood, concrete, polymers, and so on. In addition, the left surface 51 and/or second pitched edge 53 may be any size, shape, volume, etc. for securing, anchoring, or providing support to the fence rail (e.g. See FIG. 1, element 18).

Figure 6:
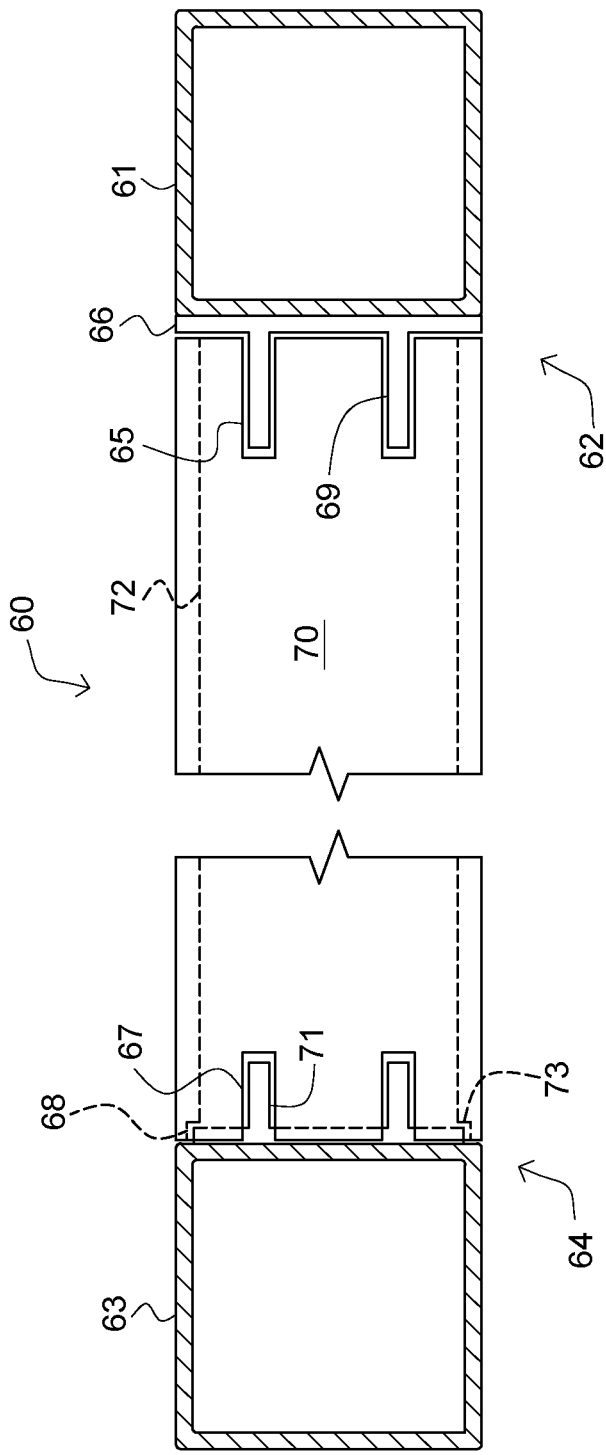
FIG. 6 is a partial bottom view of a mow strip in situ, according to one embodiment of the invention.

FIG. 6 is a partial bottom view of a mow strip assembly 60 in situ, according to one embodiment of the invention. As illustrated, there is a mow strip assembly 60, a front fence post 61, and a back fence post 63. The mow strip assembly 60 has a bottom surface 70 with a front bottom slit 65 and a back bottom slit 67. There is a front bracket 66 coupled to the front fence post 61. The front bracket 66 has a protrusion of front bracket 69. There is also a back bracket 68 coupled to the back fence post 63. The back bracket 68 has a protrusion of back bracket 71. The mow strip assembly 60 additionally has side wall of mow strip 72 and a notched side wall 73.

The illustrated bottom surface 70 is coupled to the front fence post 61 near a front 62 of the bottom surface 70, and the back fence post 63 near a back 64 of the bottom surface 70. The bottom surface 70 is coupled to the posts, 61 and 63, by brackets, 66 and 68. The brackets 66 and 68 may have any size and/or shape for coupling, holding, securing, stabilizing, etc. More, the brackets, 66 and 68, may be comprised of materials such as, but not limited to: plastic, metal, vinyl, wood, concrete, and so on. The brackets, 66 and 68, may be comprised of a polymer. Accordingly, the front fence post 61 and the back fence post 63 may anchor the mow strip body 60.

The illustrated brackets, 66 and 68, include protrusions, 69 and 71. The protrusion of front bracket 69 is coupled to the front bracket 66 and extends outwardly therefrom. Likewise, the protrusion of second bracket 71 is coupled to the back bracket 71 and extends outwardly therefrom. The protrusions, 69 and 71, may be planar members. The protrusions, 69 and 71, may be parallel to each other. More, the protrusions, 69 and 71, may be extensions of the brackets, 66 and 68.

Also illustrated, the mow strip body 60 has a bottom surface 70. Disposed along the bottom surface 70 proximate the front 62 is a front bottom slit 65. Also disposed along the bottom surface 70 proximate the back 64 a back bottom slit 67. The front bottom slit 65, and the back bottom slit 67, may house the protrusion of front bracket 69 and the protrusion of back bracket 71, respectively. As a result, the slits 65 and 67, may enable the front mounting structure (e.g. See FIG. 5, element 56) to couple to a bracket, 66 or 68, and thereby also couple to a fence post, 61 or 63. The slits, 65 and 67, may have any size, shape, dimension, volume, etc. for coupling to a bracket, 66 or 68. As a result the bottom surface may include a pair of slits, 65 and 67, extending upwardly into the mow strip body (e.g. See FIG. 1, element 16). Further, the back bracket 68 may be inset into the mow strip body (e.g. See FIG. 1, element 16).

Additionally illustrated, the mow strip assembly 60 has side wall of mow strip 72 and a notched side wall 73. The side walls, 72 and 73, may provide support to the mow strip body (e.g. See FIG. 1, element 16). In addition, the notched side wall 73 may allow for the protrusions, 69 and 71, of the brackets, 66 and 68, to tight-fit within the slits, 65 and 67. As a result, the fence posts, 61 and 63, may about the notched side wall 73, and thereby secure the mow strip body 60 to the fence posts, 61 and 63 for assembly of the mow strip assembly 60.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate brackets, 22 and 24, that are essentially the full profile of the mow strip body 16, the brackets, 22 and 24, do not have to be the full profile of the mow strip body 16. Further, the brackets, 22 and 24, can have any number of protrusions 21, and the protrusions 21 do not have to be planar. Also, the brackets, 22 and 24, may be attached to the fence posts, 32 and 30, through a variety of coupling methods, such as by: a screw, a rivet, welding, an adhesive, a nail, a bolt, a clip, friction fit, etc. Moreover, the brackets, 22 and 24, may be integral to the fence posts, 32 and 30. It is also envisioned that the brackets, 22 and 24, may be coupled to the ground at the posts, 32 and 30, by a spike, rather than coupled to the posts, 32 and 30.

It is also envisioned that the mow strip body 16 may have various profile shapes, such as linear, curved, etc. Likewise, the mow strip body 16 may have various side-profile shapes, such as rectangular, square, circular, triangular, etc. Accordingly, it is envisioned that the mow strip body 16 may be triangular for sloped areas. Also, the mow strip body 16 may have no groove 15 to couple to the rail 18. The mow strip body 16 may have internal bracing that may vary according to needs and/or have a snap-in fitting to the brackets, 22 and 24. As a result, the mow strip body 16 may be comprised of various materials and may have various manufacturing techniques, such as: blow molding, extruding, etc.

Finally, it is envisioned that the components of the assembly 10 may be constructed of a variety of materials. For instance, the mow strip assembly 10 may be comprised of materials, such as but not limited to: plastic, metal, vinyl, wood, concrete, and so on. The assembly 10 may be comprised of a polymer and/or a composite thereof, selected for its desirable properties, such as but not limited to: Low-density polyethylene (LDPE); High-density polyethylene (HDPE); Polypropylene (PP); Polyvinyl chloride (pvc); Polystyrene (PS); Nylon, nylon 6, nylon 6,6; Teflon (Polytetrafluoroethylene); and/or Thermoplastic polyurethanes (TPU).

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:
1. A mow strip kit, comprising:
  a. a front bracket and a back bracket, each bracket including a mounting plate and a protrusion extending orthogonally from the mounting plate, wherein the mounting plate of each bracket includes a spike extending downwardly configured to couple the bracket to a ground; and
  b. an elongated mow strip body having:
    i. a bottom surface extending the length of the elongated mow strip body,
    ii. a flat left surface orthogonal to the bottom surface,
    iii. a flat right surface parallel to the flat left surface, spaced apart from the flat left surface, and orthogonal to the bottom surface,
    iv. a top surface opposite the bottom surface and coupled to each of the flat left surface and flat right surface,
    v. a front mounting structure positioned orthogonal to each of the bottom surface, the flat left surface, and the flat right surface, including a slit shaped and positioned to receive the protrusion of the front bracket, and
    vi. a back mounting structure, opposite the front mounting structure, including a slit shaped and positioned to receive the protrusion of the back bracket, wherein at least one of the slits of the front mounting structure and the back mounting structure extend along and through an end of the bottom surface such that at the end of the bottom surface the elongated mow strip body may be vertically lowered directly onto one of the protrusions.

2. The kit of claim 1, wherein the top surface includes a groove extending the length thereof into which a fence rail may be disposed and cradled thereby.

3. The kit of claim 2, wherein the top surface includes a pitched edge that is not orthogonal to the flat right surface and not orthogonal to the flat left surface.

4. The kit of claim 2, wherein the slit of each of the front and back mounting structures are each disposed under the groove.

5. The kit of claim 1, wherein the protrusions of each of the front bracket and back bracket are planar members.

6. The kit of claim 1, wherein the front mounting structure and the back mounting structure each include a recess into which the front and back brackets, respectively, nestle.

7. The kit of claim 1, wherein the mounting plate of each bracket includes a coupling structure that is selectably coupleable to a fence post.

8. A mow strip assembly, comprising:
   a. a front fence post and a back fence post, each fence post including a right surface, a base, and a pair of protrusions extending orthogonally from near the base; and
   b. an elongated mow strip body coupled to each of the front fence post and the back fence post at the base of each, the elongated mow strip body having:
      i. a bottom surface extending the length of the elongated mow strip body,
      ii. a flat right surface orthogonal to the bottom surface and coplanar with the right surface of each of the front and back fence posts,
      iii. a flat left surface parallel to the flat right surface, spaced apart from the flat right surface, and orthogonal to the bottom surface,
      iv. a top surface opposite the bottom surface and coupled to each of the flat left surface and flat right surface,
      v. a front mounting structure positioned orthogonal to each of the bottom surface, the flat left surface, and the flat right surface, including a pair of slits enveloping the pair of protrusions of the front fence post, and
      vi. a back mounting structure, opposite the front mounting structure, including a pair of slits shaped and positioned to receive the pair of protrusions of the back fence post.

9. The assembly of claim 8, wherein the pair of protrusions extend from brackets coupled to each of the front and back fence posts.

10. The assembly of claim 9, wherein the brackets each include a mounting plate and the pair of protrusions are planar members parallel to each other.

11. The assembly of claim 8, wherein the top surface includes a groove extending the length thereof into which a fence rail extending between the front and back fence posts is disposed and cradled thereby.

12. The assembly of claim 11, wherein the top surface includes a pitched edge that is not orthogonal to the flat right surface and not orthogonal to the flat left surface.

13. The assembly of claim 8, wherein the pair of protrusions of each of the front fence post and back fence post are planar members that are parallel to each other.

14. The assembly of claim 8, wherein the left right surface of the elongated mow strip body is coplanar with a left surface of each of the front and back fence posts.

* * * * *